United States Patent [19]

Kurosawa

[11] Patent Number: 5,198,908
[45] Date of Patent: Mar. 30, 1993

[54] IMAGE COMMUNICATION APPARATUS AND METHOD WITH SELECTION OF MAGNIFICATION TRANSMISSION MODE AND SETTING MINIMUM TRANSMISSION TIME

[75] Inventor: Yuji Kurosawa, Kawasaki, Japan

[73] Assignee: Canon Kabushiki Kaisha, Tokyo, Japan

[21] Appl. No.: 790,591

[22] Filed: Nov. 8, 1991

[30] Foreign Application Priority Data

Nov. 13, 1990 [JP] Japan .................................. 2-304145

[51] Int. Cl.⁵ ........................ H04N 1/32; H04N 1/393
[52] U.S. Cl. .................................... 358/409; 358/442; 358/451
[58] Field of Search ............... 358/409, 439, 451, 406, 358/442; 395/102

[56] References Cited

U.S. PATENT DOCUMENTS

| | | |
|---|---|---|
| 4,353,097 | 10/1982 | Takeda et al. . |
| 4,719,514 | 1/1988 | Kurahayashi et al. . |
| 4,772,955 | 9/1988 | Kurahayashi et al. . |
| 4,775,893 | 10/1988 | Ishikawa . |
| 4,814,894 | 3/1989 | Yoshida ............................... 358/451 |
| 4,845,569 | 7/1988 | Kurahayashi et al. . |
| 4,885,641 | 12/1989 | Kato . |

Primary Examiner—Benjamin R. Fuller
Assistant Examiner—Scott A. Rogers
Attorney, Agent, or Firm—Fitzpatrick, Cella, Harper & Scinto

[57] ABSTRACT

An image communication apparatus having a mode to transmit image data with unity-magnification and a mode to transmit the image data with size reduction, comprises a selector for selecting one of the unity-magnification transmission mode and the reduced size transmission mode and a setter for setting one of different minimum transmission times in accordance with the mode selected by the selector.

5 Claims, 2 Drawing Sheets

IMAGE COMMUNICATION APPARATUS AND METHOD WITH SELECTION OF MAGNIFICATION TRANSMISSION MODE AND SETTING MINIMUM TRANSMISSION TIME

BACKGROUND OF THE INVENTION

1. Field of the Invention

The present invention relates to an image communication apparatus, and more particularly to an image communication apparatus having a unity-magnification transmission/reduced size transmission function.

2. Related Background Art

A facsimile apparatus which transmits image data of a reduced size in accordance with a user setting or in order to match a size of a document sheet or record sheet at transmitting and receiving stations has been known. Such a facsimile apparatus having the reduced size transmission function is disclosed in U.S. Pat. Nos. 4,353,097; 4,423,439; 4,814,894; 4,772,955; 4,845,569 and 4,885,641.

In a convertional facsimile apparatus, a certain minimum time is required to read one line of image data. In a receiving station, a certain minimum time is also required to record the received one line of image data. Accordingly, in the facsimile transmission, if the time required to transmit one line of image data is shorter than the minimum read time (a minimum transmission time of the transmitter) or the minimum record time (a minimum transmission time of the receiver), the image data to be transmitted may be empty or the data may overflow at the receiving station. Thus, the longer one of the minimum transmission time of the transmitter and the minimum transmission time of the receiver is set as a minimum transmission time of the communication. If the time required to transmit one line of image data is shorter than the preset minimum transmission time, fill data is added to the line data before the transmission. The addition of the fill data is disclosed in U.S. Pat. Nos. 4,719,514 and 4,775,893.

The minimum transmission time of the transmitter is determined by a storage time of a read device such as CCD and a feed speed of a feed motor for the document sheet. In the facsimile apparatus having the reduced size transmission function, a single minimum transmission time for the transmitter is set whether it is used in a unity-magnification transmission mode or a reduced size transmission mode. Since the transmission is done with the single minimum transmission time for both the unity-magnification transmission mode and the reduced size transmission mode in the prior art apparatus, it is necessary to rotate the document sheet feed motor faster in the reduced size transmission mode than in the unity-magnification mode. Thus, a high performance motor is required and this leads to the increase of a cost.

Instead of increasing the speed of the feed motor in the reduced size transmission mode, the minimum transmission time of the apparatus may be set to fit to the reduced size transmission mode. In this case, however, the minimum transmission time is long in the unity-magnification transmission mode and a longer transmission time is required.

SUMMARY OF THE INVENTION

It is an object of the present invention to improve an image communication apparatus.

It is another object of the present invention to provide an image communication apparatus which uses different minimum transmission times of the apparatus for the unity-magnification transmission mode and the reduced size transmission mode.

Other objects of the present invention will be apparent from the following description of the embodiments and the drawings.

DETAILED DESCRIPTION OF THE PREFERRED EMBODIMENTS

One embodiment of the present invention is now explained in detail with reference to the drawings.

Figure 1:
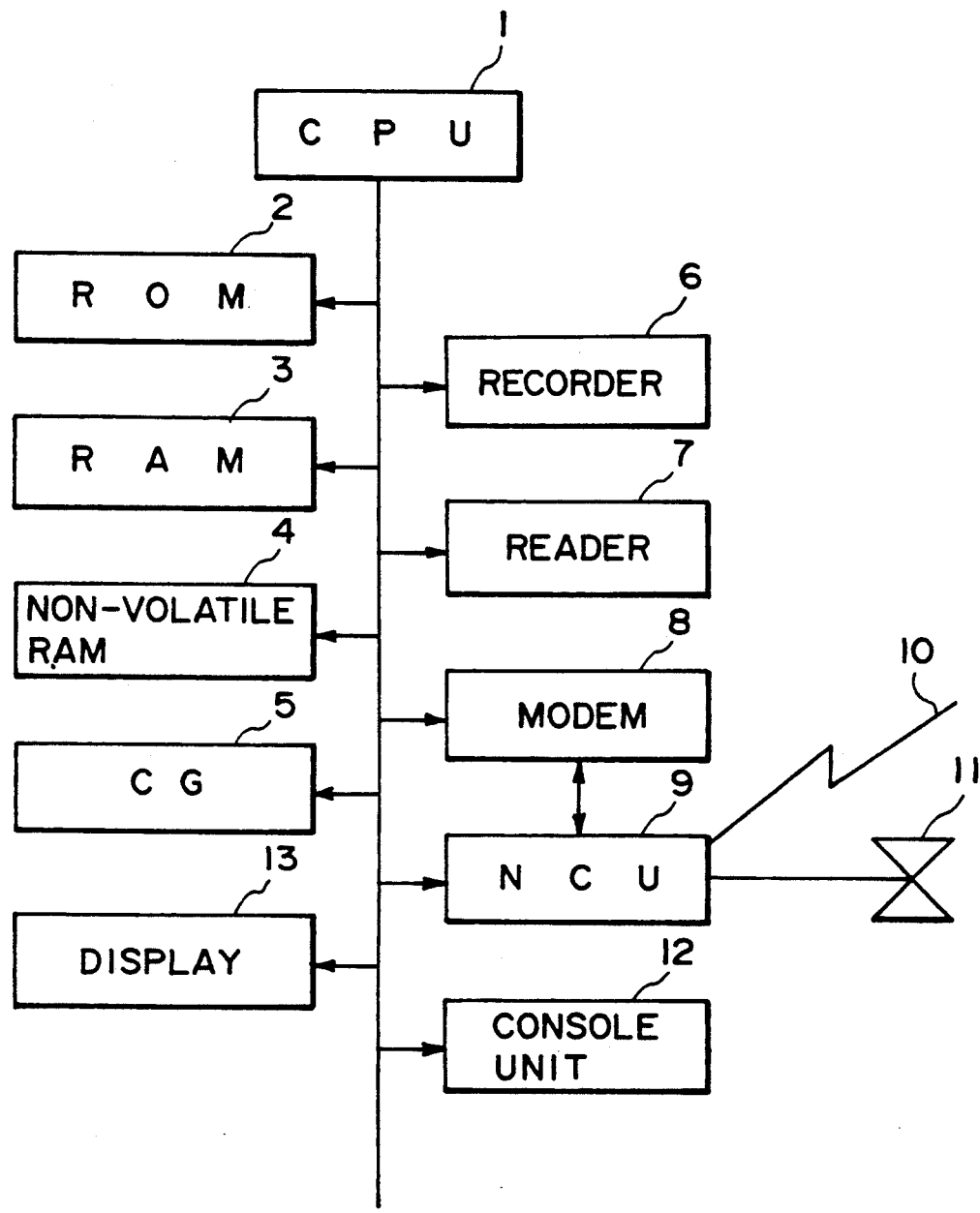
FIG. 1 shows a block diagram of a configuration of a facsimile apparatus in accordance with one embodiment of the present invention.

FIG. 1 shows a block diagram of a facsimile apparatus of the present embodiment.

A CPU 1 comprises a microprocessor and controls the entire facsimile apparatus which comprises a RAM 3, a non-volatile RAM 4, a character generator (CG) 5, a recorder 6, a reader 7, a modem 8, a network control unit (NCU) 9, a console unit 12, a display 13 and a selection signal sender 14, in accordance with a program stored in the ROM 2.

The RAM 3 stores binary image data read by the reader 7 or binary image data to be recorded by the recorder 6, and stores binary image data which is modulated by the modem 8 and supplied to a telephone line 10 through the NCU 9.

The RAM 3 also stores binary data which is demodulated from an analog signal supplied through the telephone line 10, by the NCU 9 and the modem 8

The non-volatile RAM 4 holds the data to be preserved even if a power supply of the facsimile apparatus is shut down. The non-volatile RAM 4 is one of registration means to register names of destinations and telephone numbers thereof through the console unit 12.

The CPU 1 has a function of transmission control means which transmits a name of destination corresponding to an input telephone number of the destination to a destination receiver, in accordance with a program stored in the ROM 2.

The CG 5 is a ROM which stores character codes such as JIS codes or ASCII codes and provides character data for a predetermined code by 2-byte data under the control of the CPU 1.

The recorder 6 comprises a DMA controller, a sub-CPU, a thermal head and a TTL logic IC. It reads the record data stored in the RAM 3 under the control of CPU 1 and records it as a hard copy.

The reader 7 comprises a DMA controller, a sub-CPU, an image sensor and a TTL logic IC. It binarizes the data read by the CCD under the control of the CPU 1 and sequentially sends the binary data to the RAM 3.

The load status of the document sheet to the reader 7 may be detected by a document sheet sensor such as a photo-sensor arranged in a feed path of the document sheet. A document sheet sense signal is applied to the CPU 1.

The modem 8 comprises G3, G2, G1 and FM modes and a clock generator connected to the modems. It modulates the transmission data stored in the RAM 3 under the control of the CPU 1 and sends it to the telephone line 10 through the NCU 9. The modem 8 also supplies the analog signal from the telephone line 10 to the NCU 9, modulates it and stores the binarized data in the RAM 3.

The NCU 9 has a line control function to selectively connect the telephone line to the modem 8 or a telephone set 11 under the control of the CPU 1.

The telephone set 11 is integrated with the facsimile apparatus and a dialing unit is integrated with the console unit 12. More specifically, the telephone set 11 comprises a bond set, a speech network, a dialer and a ten-key or one-touch keys.

The console unit 12 comprises a key to start the image transmission/reception, a mode selection key to specify an operation mode in the transmission/reception such as fine, normal, auto-receive, and a ten-key for dialing. The CPU 1 detects the depression of those keys to control the respective units.

The display 13 is a liquid crystal display which displays 16 digits, and displays predetermined characters under the control of the CPU 1.

The operation of the apparatus is explained in detail with reference to FIG. 2. The apparatus of FIG. 1 can operate in both the reduced size transmission mode and the unity-magnification (equal size) transmission mode. The reduced size transmission mode is automatically set when the size of the record sheet at the receiving station is smaller than the size of the document sheet. The size reduction of the transmission image is done by partially taking out the image date read into the RAM 3.

Figure 2:
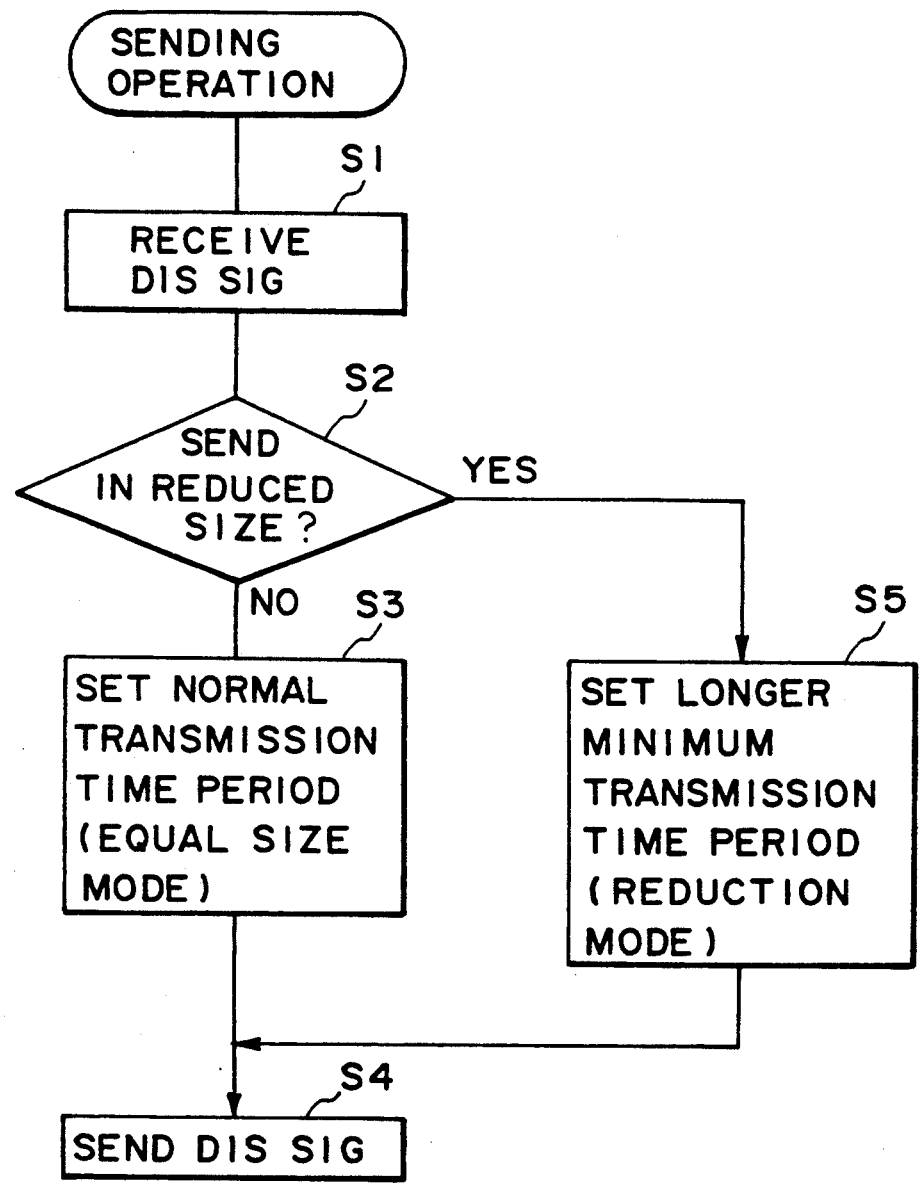
FIG. 2 shows a flow chart of a communication protocol in the transmission.

FIG. 2 shows a flow of a control program which is executed in a communication pre-protocol of the CPU 1, stored in the ROM 2.

In the present embodiment, the minimum transmission time information for the unity-magnification transmission mode and the minimum transmission time for the reduced size transmission mode are previously stored in the ROM 2 (or the non-valatile RAM 4).

FIG. 2 shows a portion to be inserted to the prior art communication protocol when the apparatus of FIG. 1 functions as the transmitter.

In the G3 facsimile protocol, the receiving unit rends a DIS (digital indentification) signal when it receives the signal. In a step S1, the DIS signal is received, and the content thereof is analyzed to determine the size of the record sheet of the receiving unit and the minimum transmission time.

In a step S2, the size of the document sheet of the transmitting unit is detected, and the unity-magnification (equal size) transmission mode or the reduced size transmission mode is selected in accordance with the size of the record sheet of the receiving unit which is contained in the DIS signal. The image data of the document sheet is previously read by the reader 7 and stored in the RAM 3.

When the unity-magnification transmission mode is to be selected as a result of the decision in the step S2, a longer one of the minimum transmission time of the receiving unit which is indicated by the DIS signal and the minimum transmission time for the unity-magnification transmission mode of the transmitting unit is set in a DCS (digital command) signal which is to be sent back in response to the DIS signal, in a step S3. The DCS signal is sent in a step S4.

On the other hand, if the reduced size transmission mode is selected in the step S2, a longer one of the minimum transmission time of the receiving unit and the minimum transmission time in the reduced size transmission mode of the transmitting unit (which is longer than that in the unity-magnification transmission mode in the present embodiment) is set in the DCS signal, in a step S5. The DCS signal is sent in the step S4.

In the transmitting unit, the minimum transmission time in the reduced size transmission mode is always longer than that in the unity-magnification transmission mode, but in the actual transmission, the minimum transmission times in the unity-magnification transmission mode and the reduced size transmission mode may be equal to the minimum transmission time of the receiving unit depending on the minimum transmission time of the receiving unit, if it is very long.

In the present apparatus, since the minimum transmission time in the reduced size transmission mode is set longer than that in the unity-magnification transmission mode, it is not necessary to rotate the document sheet feed motor of the reader at a high speed in the reduced size transmission mode as is done in the prior art apparatus, and the high speed communication is attained in the unity-magnification transmission mode without increasing the cost of the document sheet feed motor of the reader 7.

While the communication protocol of the CCITT Recommendation has been discussed above, the image communication protocol is not limited thereto.

The present invention is not limited to the above embodiment but various modifications thereof may be made.

What is claimed is:

1. An image communication apparatus having a mode to transmit image data with unity-magnification and a mode to transmit the image data with size reduction, comprising:
   means for selecting one of the unity-magnification transmission mode and the reduced size transmission mode; and
   means for setting one of a different minimum transmission times in accordance with a mode selected by said selection means.

2. An image communication apparatus having a mode to transmit image data with unity-magnification and a mode to transmit the image data with size reduction, comprising:
   means for selecting one of the unity-magnification transmission mode and the reduced size transmission mode; and
   means for setting one of different minimum transmission times in accordance with a mode selected by said selection means,
   wherein said setting means set a longer minimum transmission time to the reduced size transmission mode than to the unity-magnification transmission mode.

3. An image communication apparatus having a mode to transmit image data with unity-magnification and a mode to transmit the image data with size reduction, comprising:
   means for selecting one of the unity-magnification transmission mode and the reduced size transmission mode; and
   means for setting one of different minimum transmission times in accordance with a mode selected by said selection means,
   wherein said setting means compares minimum transmission time information of a receiving unit and minimum transmission time information of the apparatus and sets a longer one as a minimum transmission time of the receiving unit, and selects a first minimum transmission time as the minimum transmission time of the apparatus in the unity-magnification transmission mode and selects a second minimum transmission time in the reduced size transmission mode for comparison with the minimum transmission time of the receiving unit.

4. A method for communicating image comprising the steps of:
   selected one of a mode to transmit image data with unity-magnification and a mode to transmit the image data with size reduction;
   selecting one of a first minimum transmission time as a minimum transmission time from a transmitting apparatus when the unity-magnification transmission mode is selected and a second minimum transmission time as the minimum transmission time from the transmitting apparatus when the reduced size transmission mode is selected; and
   comparing the selected minimum transmission time with a minimum transmission time of a receiving unit and conducting the image transmission in accordance with a longer one of the selected transmitter minimum transmission time and the receiver minimum transmission time.

5. A method for communicating image according to claim 4 wherein the second minimum transmission time is longer than the first minimum transmission time.

* * * * *